United States Patent [19]

Eldin

[11] Patent Number: 4,667,010

[45] Date of Patent: May 19, 1987

[54] CROSSLINKABLE LINEAR POLYETHER RESIN

[75] Inventor: Sameer H. Eldin, Fribourg, Switzerland

[73] Assignee: Ciba-Geigy Corporation, Ardsley, N.Y.

[21] Appl. No.: 819,981

[22] Filed: Jan. 14, 1986

Related U.S. Application Data

[63] Continuation of Ser. No. 707,273, Mar. 1, 1985, abandoned.

[30] Foreign Application Priority Data

Mar. 7, 1984 [CH] Switzerland ............... 1123/84

[51] Int. Cl.$^4$ ............................................. C08G 65/42
[52] U.S. Cl. ..................... 528/125; 522/162; 525/471; 525/534; 525/535; 528/126; 528/174; 528/205; 528/219
[58] Field of Search ............. 528/219, 125, 126, 174, 528/205; 525/534, 535, 471; 522/162

[56] References Cited

U.S. PATENT DOCUMENTS

| | | | |
|---|---|---|---|
| 3,332,909 | 7/1967 | Farnham et al. | 528/219 |
| 3,753,946 | 8/1973 | Holub et al. | 260/47 CZ |
| 3,763,101 | 10/1973 | Jones et al. | 260/47 CP |
| 3,959,101 | 5/1976 | Staniland et al. | 204/159.11 |
| 4,269,953 | 5/1981 | Brand | 525/534 |
| 4,307,222 | 12/1981 | Schwab et al. | 528/219 |
| 4,414,269 | 11/1983 | Lubowitz et al. | 428/290 |

FOREIGN PATENT DOCUMENTS 1357114  6/1974  United Kingdom .

OTHER PUBLICATIONS

E. M. Richardson et al, J. Am. Chem. Soc. 62, 413 (1940).

Primary Examiner—Harold D. Anderson
Attorney, Agent, or Firm—Luther A. R. Hall

[57] ABSTRACT

Linear polyether resins containing 100 to 10 mol % of the repeating structural unit of formula I

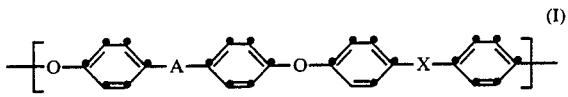

and 90 to 0 mol % of the repeating structural unit of formula II

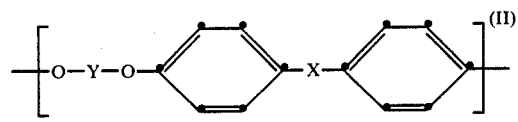

wherein A is a linear unsubstituted or methyl-substituted alkylene group containing 4 to 100 carbon atoms in the linear alkylene chain, X denotes bridge members as defined in claim 1 and Y is an aromatic radical of a divalent phenol as defined in claim 1, are self-crosslinkable and can be crosslinked by heating to a temperature of not less than 250° C. or by irradiation with energy-rich electromagnetic rays, affording products which are insoluble in organic solvents and which have high glass transition temperatures.

9 Claims, No Drawings

CROSSLINKABLE LINEAR POLYETHER RESIN

This is a continuation of application Ser. No. 707,273, filed Mar. 1, 1985, now abandoned.

The present invention relates to novel polyether resins prepared from specific bis(hydroxyphenyl)alkanes and which can be crosslinked by heat or irradiation, and to the products obtained from said polyether resins by crosslinking.

Aside from their known technical advantages, polyether resins—like other thermoplastics—suffer from the drawback of a pronounced tendency to creep under load at elevated temperature and also of an insufficient resistance to organic solvents.

There has been no lack of attempts to remedy these shortcomings by crosslinking the polyether resins by adding a crosslinking agent such as a specific biphenylene compound (q.v. U.S. Pat. No. 4,269,953) or sulfur or an organic sulfur compound (British patent specification No. 1 357 114), or by end capping polyether polymers with reactive end groups that effect crosslinking. Such end groups are the unsaturated alicyclic endo groups disclosed for example in U.S. Pat. No. 3,763,101, and the nadicimidyl, maleimidyl or ethynyl groups disclosed in European patent application No. 0 067 976.

It has now been found that crosslinkable polyether resins can be obtained in simple manner by employing, wholly or partly, α,ω-bis(hydroxyphenyl)alkanes that contain not less than 4 carbon atoms in the alkylene moiety, as starting materials. These specific polyether resins are self-crosslinking and undergo transformation into the crosslinked state when heated to a temperature of about 250° C. or when irradiated with energy-rich electromagnetic rays.

Accordingly, the present invention relates to crosslinkable linear polyether resins having a specific viscosity of 0.1 to 2.5, measured at 30° C. in a 2% solution in dimethylformamide, and containing, based on the total amount of structural units present in the polyether resin, 100 to 10 mol % of the repeating structural unit of formula I

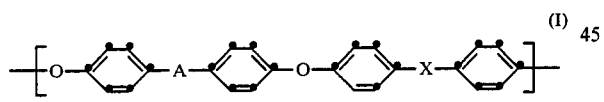

and 90 to 0 mol % of the repeating structural unit of formula I

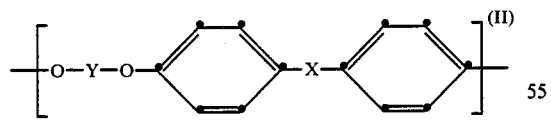

in which formulae above A is a linear unsubstituted or methyl-substituted alkylene group containing 4 to 100 carbon atoms in the linear alkylene chain, X is a member selected from the group consisting of —SO$_2$—, —CO—, —SO—, —N=N—, —CF$_2$—CF$_2$—,

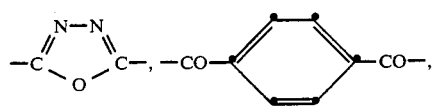

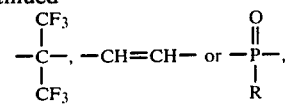

wherein R is C$_1$–C$_8$ alkyl, or is

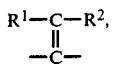

wherein each of R' and R$^2$ is a hydrogen or a halogen atom, Y is a radical of formula III or IV

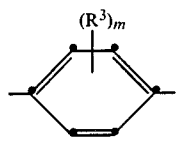

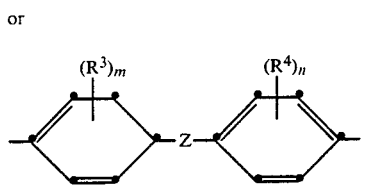

wherein R$^3$ and R$^4$ are the same or different and each is a halogen atom, C$_1$–C$_4$ alkyl or C$_1$–C$_4$ alkoxy, m and n are 0 or an integer from 1 to 4, and Z is a direct bond or a radical selected from the group consisting of —O—, —SO—, —SO$_2$—, —S—, —S—S—,

wherein each of R$^5$ and R$^6$ independently of the other is a hydrogen atom, C$_1$–C$_4$ alkyl or phenyl, or is

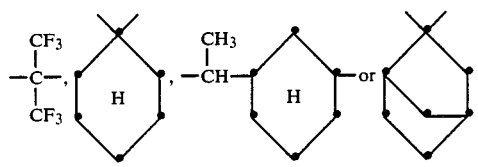

The polyether resins of the present invention preferably contain 100 to 20 mol %, most preferably 50 to 30 mol %, of the repeating structural unit of formula I and 80 to 0 mol %, preferably 70 to 50 mol %, of the repeating structural unit of formula II.

Further, the polyether resins of this invention preferably have a specific viscosity of 0.2 to 1.5, most preferably of 0.2 to 1.0.

It is common knowledge that the specific viscosity is a reference standard for determining the molecular weight of polymers. The indicated values of the specific viscosity of 0.1 to 2.5 correspond to an average molecular weight in the range from about 1000 to 50,000.

The radical A in the structural unit of the formula I is preferably an unsubstituted alkylene group containing 4 to 20, preferably 4 to 8, carbon atoms in the linear alkylene chain.

The radical X in the structural units of the formulae I and II is preferably —SO$_2$—, —CO—, —SO—, —CF$_2$—CF$_2$—,

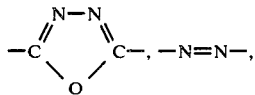

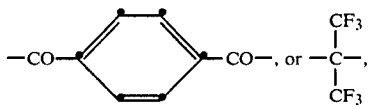

most preferably —SO$_2$— or —CO—.

In the structural unit of formula II, Y is preferably a radical of the formula III or IV, wherein m and n are 0 and Z is a direct bond or a radical selected from the group consisting of —O—, —SO—, —SO$_2$—, —S—, —S—S—, —CH$_2$—,

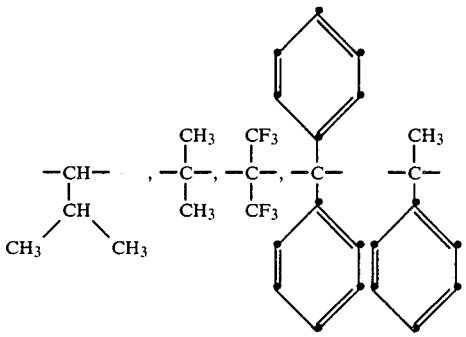

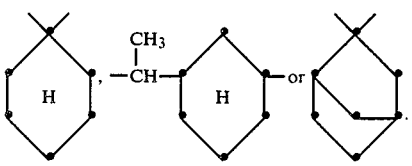

Most preferably, Y is a radical of formula IV, wherein m and n are 0 and Z is isopropylidene or methylene.

The polyether resins of this invention can be prepared for example by polycondensing a dihalo compound of formula V

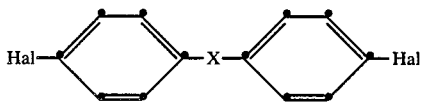

in equimolar amounts, with an α,ω-di-(p-hydroxyphenyl)alkane of formula VI

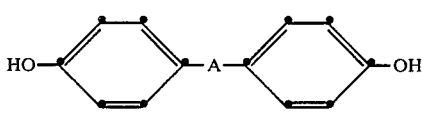

or with a mixture of a compound of formula VI and a phenol contained therein in an amount of up to 90 mol %, preferably of up to 80 mol %, of the formula VII $$HO—Y—OH \qquad (VII)$$

wherein X, A and Y are as defined in formula I and II and Hal is a halogen atom, preferably a fluorine or chlorine atom, most preferably a chlorine atom, in the presence of alkali and in a polar aprotic solvent, until the resultant polyether resin has a specific viscosity of 0.1 to 2.5, measured at 30° C. in a 2% solution in dimethylformamide.

The particularly preferred polyether resins are prepared by polycondensing a dihalo compound of formula V with a mixture of 50 to 30 mol % of an α,ω-di-(p-hydroxyphenyl)alkane of formula VI and 70 to 50 mol % of a phenol of formula VII, in equimolar amounts.

The expression "equimolar amounts" will be understood in this connection as meaning a molar ratio of about 0.8 to 1.2.

The polycondensation reaction is preferably carried out until the specific viscosity of the resultant polyether resins is in the range from 0.2 to 1.5, preferably from 0.2 to 1.0.

It is preferred to carry to conduct the reaction in the presence of an entrainer, for example chlorobenzene, in order to be able to remove the water of reaction as an azeotrope from the reaction mixture.

A strong alkali such as solid sodium hydroxide or aqueous sodium hydroxide solution will normally be employed in the reaction; but it is also possible to use other alkalies such as potassium hydroxide, barium hydroxide, calcium hydroxide, sodium carbonate or potassium carbonate.

Examples of polar aprotic solvents eligible for use in the process for the preparation of the polyether resins of this invention are: dimethylsulfoxide, dimethylacetamide, diethylacetamide, tetramethylurea, N-methylcaprolactam, N-methylpyrrolidone, acetone, dioxan, ethyl acetate and tetrahydrofuran.

The dihalo compounds of formula V are known and some are commercially available. Examples of suitable compounds of formula V are: 4,4'-dichlorodiphenylsulfone, 4,4'-difluorodiphenylsulfone, 4,4'-dichlorodiphenylsulfoxide, 4,4'-dichlorobenzophenone, 4,4'-dichloroazobenzene, 1,2-bis(p-chlorophenyl)tetrafluoroethane and 2,2-bis(p-fluorophenyl)hexafluoropropane.

The phenols of formula VII are also known compounds, some of which are commercially available. Examples of suitable divalent phenols which can be used for the preparation of the polyether resins of this invention are: hydroquinone, methylhydroquinone, 2,3-dimethylhydroquinone, 4,4'-dihydroxydiphenyl, bis(4-hydroxyphenyl)ether, 4,4'-dihydroxy-2,6-dimethyldiphenyl ether, bis(4-hydroxy-3-isobutylphenyl)ether, bis(4-hydroxy-3-isopropylphenyl)ether, bis(4-hydroxy-3-chlorophenyl)ether, bis(4-hydroxy-3-fluorophenyl)ether, bis(4-hydroxy-3-bromophenyl)ether, 4,4'-dihydroxy-3,6-dimethoxydiphenyl ether, 4,4'-dihydroxy-2,5-diethoxydiphenyl ether, bis(4-hydroxyphenyl)sulfone, 5'-chloro-4,4'-dihydroxydiphenylsulfone, bis(4-hydroxyphenyl)methane (bisphenol F), bis(4-hydroxy-2,6-dimethyl-3methoxyphenyl)methane, 2,2-bis(4-hydroxyphenyl)propane (bisphenol A), 2,2-bis(3-methyl-4-hydroxyphenyl)propane, 2,2-bis(3-phenyl-4-hydroxyphenyl)propane, 2,2-bis(3-isopropyl-4-hydroxyphenyl)propane, 2,2-bis(2-isopropyl-4-hydroxyphenyl)propane, 2,2-bis(3,5-dibromo-4-hydroxyphenyl)propane, 2,2-bis(4-hydroxyphenyl)pentane, 3,3-bis(4-hydroxyphenyl)pentane, bis(4-hydroxyphenyl)-phenylmethane, 2,2-bis(4-hydroxyphenyl)-1-phenylpropane and 2,2-bis(4-hydroxyphenyl)-1,1,1,3,3,3-hexafluoropropane.

Some of the α,ω-di-(p-hydroxyphenyl)alkanes of formula VI are known compounds. Those that are novel likewise constitute an object of the invention. The α,ω-di-(p-hydroxypheny)alkanes containing 9 or 11 and more carbon atoms in the linear alkylene moiety have not yet been described in the literature.

The compounds of formula VI can be prepared for example by the process disclosed in the Journal of the American Chemical Society, Vol. 62 (1940), pp. 413-415, by condensing a linear unsubstituted or methyl-substituted alkanedicarboxylic acid dichloride containing 2 to 98 carbon atoms in the linear alkylene chain with an alkylphenyl ether, e.g. anisole or phenetol, in the molar ratio of 1:2, with removal of HCl, to give the corresponding diketone, then hydrogenating both keto groups to methylene groups and subsequently hydrolysing both alkoxy groups.

Examples of suitable alkanedicarboxylic acid dichlorides for the preparation of α,ω-di-(p-hydroxyphenyl)alkanes are the acid chlorides of succinic acid, methylsuccinic acid, glutaric acid, 2-methylglutaric acid or 3-methylglutaric acid, 3,3-dimethylglutaric acid, adipic acid, 3-methyladipic acid, pimelic acid, sebacic acid, nonanedioic acid, dodecanedioic acid, undecanedioic acid and tetradecanedioic acid.

The polyether resins of this invention can be employed and processed in the conventional manner for thermoplastics. They can be used for example as moulding or coating compounds or for making films. Prior to processing, conventional auxiliaries such as fillers, pigments, stabilisers or reinforcing agents, for example carbon, boron or glass fibres, can be added to the polyether resins obtained in the form of moulding powders, melts or solutions in a customary organic solvent. The polyether resins of this invention can also be processed together with other thermoplastics such as polyesters, polyamides, polyimides, polyolefins or polyurethanes, in particular with the conventional polyether resins.

The polyether resins of the present invention preferably find utility as matrix resins for the preparation of fibrous composite structures employing, as reinforcement fibres, the fibres conventionally used for reinforcing moulding materials. These fibres may be organic or inorganic fibres, natural fibres or synthetic fibres, as for example aramide fibres, and may be in the form of bundles or continuous filaments. Exemplary of reinforcement fibres employed are glass, asbestos, boron, carbon and metal fibres, with carbon and metal fibres being preferred. Such fibres and fabrics made therefrom are commercially available.

As mentioned at the outset, the polyether resins of this invention can be crosslinked by heat or by irradiation with energy-rich electromagnetic rays. Accordingly, the products obtained by crosslinking the polyethers of the invention also fall within the scope of this invention.

A temperature of not less than 250° C. is necessary for heat crosslinking the polyethers. The heat crosslinking can, if desired, be carried out in the presence of radical formers, e.g. inorganic or organic peroxides such as potasasium peroxide sulfate or benzoyl peroxide, azo compounds such as azoisobutyronitrile, organic hydroperoxides, α-haloacetophenones, benzoin or ethers thereof, benzophenones, benzil acetals, anthraquinones, arsines, phosphines or thioureas.

The crosslinking of the polyethers of the present invention can be carried out with energy-rich rays, for example with X-rays, accelerated electrons or with γ-rays emitted from a $^{60}$Co source.

Polymers which are no longer soluble in conventional organic solvents and which, in addition, have an appreciably higher glass transition temperature, are obtained by crosslinking the polyethers of this invention.

Preparation of 1,6-bis(4-hydroxyphenyl)hexane (a) A flask is charged with 500 ml of nitrobenzene and 399.9 g of aluminium chloride are stirred in. Then 227.1 g (2.1 moles) of anisole are added. While cooling to 15°-20° C., 183.0 g (1.0 mole) of adipoyl dichloride are stirred in dropwise over 2 hours, whereupon evolution of HCl gas commences. The reaction solution is then further stirred until the evolution of HCl gas has ceased. The reaction product is washed 5 times with 2 liters of water and then isolated from the organic nitrobenzene phase by steam distillation.

Yield: 322.8 g (98.9% of theory) of 1,6-bis(4-methoxyphenyl)hexanedione with a melting point of 143°-145° C.

(b) With stirring, 212.2 g (0.65 mole) of 1,6-bis(4-methoxyphenyl)hexanedione in 500 ml of toluene are heated to 80° C. Then 520 g of amalgamated zinc filings as well as 150 ml of water and 500 ml of hydrochloric acid are added, whereupon evolution of $H_2$ gas commences. After the evolution of gas has subsided, the reaction solution is gently refluxed overnight. After filtration, the aqueous phase which has been separated from the organic phase is extracted with 200 ml of toluene. The organic phases are combined and subjected to fractional distillation, affording 412.6 g (69.1% of theory) of almost colourless crystals of 1,6-bis(4-methoxyphenyl)hexane.

(c) 64.0 g (0.21 mole) of 1,6-bis(methoxyphenyl)hexane, 107.4 g of 48% hydrobromic acid and 281.2 g of pure acetic acid are put into a flask and the thick suspension is slowly heated to gentle reflux. The clear solution so obtained is then refluxed overnight. After cooling to room temperature, the slightly brownish red solution is stirred into 3 liters of water. The precipitate is isolated by filtration, washed with water until neutral and dried in vacuo at 70°-80° C., affording 55.6 g (97.9% of theory) of 1,6-bis(4-hydroxyphenyl)hexane with a melting point of 143°-144° C.

EXAMPLE 1

An apparatus comprising a dry, clean 4-necked flask which is continually flushed with nitrogen and is fitted with impeller, reflux condenser, $N_2$ inlet and water separator is charged with 13.52 g (0.050 mole) of 1,6-bis(4-hydroxyphenyl)hexane, 13.52 g (0.0470 mole) of 4,4'-dichlorodiphenyl sulfone, 54 ml of dimethylsulfoxide and 140 ml of chlorobenzene. The clear solution obtained is heated, with stirring, to 70° C. and at this temperature 8.0 g (0.10 l mole) of a 50.0% aqueous solution of sodium hydroxide are added. The reaction mixture is slowly heated over 1 hour to the actual reaction temperature of 155°-160° C. During this time, water and chlorobenzene are distilled off completely. After 1 hour at 157°-158° C., the reaction mixture is diluted with 150 ml of chlorobenzene. The sodium chloride formed during the reaction precipitates in very fine form and is isolated by filtration, dried and weighed. The amount corresponds almost to b 100% of theory and the purity is >98% (silver nitrate titration). The pure solution of the polymer in dimethylsulfoxide is well stirred dropwise into 2 liters of methanol. After filtration, the precipitated polymer is dried to constant weight in vacuo and under high vacuum at 60° C.

Yield: 25.7 g (95.0% of theory).

Characteristic data of the polymer $\eta_{sp}$=1.05 (2.0% solution in dimethylformamide at 30° C.)
$\overline{M}n$=23318.

It is common knowledge that the molecular weight can be determined, inter alia, from the ratio of the condensation partners and from the ratio of monomers/solvent. Correponding values for this Example are:

| | |
|---|---|
| ratio of the condensation partners, expressed = as mol % of 4,4'-dichlorodiphenyl sulfone | 94% |
| monomer concentration, g/100 ml of dimethylsulfoxide = | 50.1. |

EXAMPLE 2

The apparatus of Example 1 is charged with 6.76 g (0.025 mole) of 1,6-bis(4-hydroxyphenyl)hexane, 11.41 g (0.050 mole) of bisphenol A, 21.33 g (0.07425 mole) of 4,4'-dichlorodiphenyl sulfone, 65.0 ml of dimethylsulfoxide and 210 ml of chlorobenzene. The polycondensation of Example 1 is carried out, except that 12.0 g (0.150 mole) of 50.0% aqueous sodium hydroxide solution are used.

Yield: 34.7 g (90.0% of theory).

Characteristic data of the polymer $\eta_{sp}$=1.25 (2.0% solution in dimethylformamide at 30° C.)
$\overline{M}n$=22700.

| | |
|---|---|
| Ratio of the condensation partners, expressed = as mol % of 4,4'-dichlorodiphenyl sulfone | 99% |
| monomer concentration, g/100 ml of dimethylsulfoxide = | 60.8. |

EXAMPLE 3

The apparatus of Example 1 is charged with 6.76 g (0.025 mole) of 1,6-bis(4-hydroxyphenyl)hexane, 10.04 g (0.050 mole) of bisphenol F, 21.33 g (0.07425 mole) of b 4,4'-dichlorodiphenyl sulfone, 65.0 ml of dimethylsulfoxide, 210 ml of chlorobenzene and 12 g (0.15 mole) of 50% sodium hydroxide solution, and polycondensation is carried out as described in Example 1.

Yield: 29.4 g of polymer with $\eta_{sp}$=1.49, measured in a 2% solution of dimethylformamide at 30° C.

EXAMPLE 4

The apparatus of Example 1 is charged with 66.76 g (0.025 mole) of 1,6-bis(4-hydroxyphenyl)hexane, 10.04 g (0.050 mole) of technically prepared bisphenol F (mixture f isomers), 21.33 g (0.07425 mole) of 4,4'-dichlorodiphenyl sulfone, 65.0 ml of dimethylsulfoxide, 210 ml of chlorobenzene and 12 g (0.15 mole) of 50% sodium hydroxide solution, and polycondensation is carried out as described in Example 1.

Yield: 29.6 g of polymer with $\eta_{sp}$=1.32, measured in a 2% solution of dimethylformamide at 30° C.

EXAMPLE 5

A reaction vessel flushed with $N_2$ is charged with 6.76 g (0.025 mole) of 1,6-bis(4-hydroxyphenyl)hexane, 11.41 g (0.050 mole) of bisphenol A (98.3% pure), 18.8 g (0.07425 mole) of 4,4'-dichlorobenzophenone, 65.0 ml of dimethylsulfoxide and 210 ml of chlorobenzene, and the mixture is heated to 75° C. 12.0 g (0.15 mole) of 50% sodium hydroxide solution are added to the clear yellow solution at b 71° C. After a few minutes the solution turns dark and turbid at 74° C. The temperature is then slowly raised over 2 hours to the actual reaction temperature of about 160° C. During this time, water and chlorobenzene are first distilled off as azeotropes and then chlorobenzene is distilled off alone. After a reaction time of 4¼ hours at 156°–160° C., the reaction mixture is diluted with 200 ml of chlorobenzene and then NaCl formed during the polycondensation is isolated by filtration at 80° C. The clear, dark browwn solution is then well stirred dropwise into 3 liters of methanol, whereupon a beige-coloured polymer precipitates in very fine non-tacky form. The product is isolated by filtration, dried in vacuo and then under high vacuum at 70°–80° C.

Yield: 29.1 g of polymer with $\eta_{sp}$=0.35, measured in a 2% solution in dimethylformamide at 30° C.

EXAMPLE 6

Crosslinking of the polymers

The crosslinking of the polymers is effected by a heat treatment at 250° C. The appropriate data are reported in the following table.

| | Polymer as obtained | | | Polymer after heat treatment | |
|---|---|---|---|---|---|
| Polymer of Example | Tg (TBA)* | Resistance to MEK** | Heat treatment | Tg (TBA) | Resistance to MEK |
| 1 | 106° C. | soluble | 6 h/250° C. | 209° C. | insoluble |
| 2 | 142° C. | soluble | 7 h/250° C. | 183° C. | insoluble |
| 3 | 143° C. | soluble | 3 h/250° C. | 177° C. | insoluble |
| 4 | 138° C. | soluble | 3 h/250° C. | 188° C. | insoluble |
| | | | 1 h/250° C.⎫ 1 h/280° C.⎭ | 285° C. | insoluble |
| 5 | 109° C. | soluble | 5 h/250° C. | 167° C. | insoluble |

*TBA = torsional braid analysis
**MEK = methyl ethyl ketone

The significant increase in the glass transition temperature and, in particular, the fact that the polymers are insoluble in methyl ethyl ketone after the heat treatment, indicate crosslinking.

What is claimed is:

1. A crosslinkable linear polyether resin having a specific viscosity of 0.1 to 2.5, measured at 30° C. in a 2% solution in dimethylformamide, and containing, based on the total amount of structural units present in the polyether resin, 100 to 10 mol % of the repeating structural unit of formula I

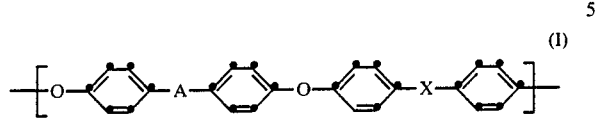
(I)

and 90 to 0 mol % of the repeating structural unit of formula II

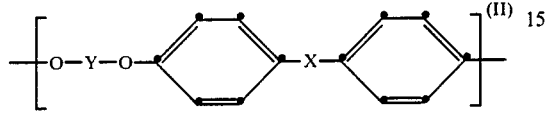
(II)

in which formulae above A is a linear unsubstituted or methyl-substituted alkylene group containing 4 to 20 carbon atoms in the linear alkylene chain, X is a member selected from the group consisting of —$SO_2$—, —CO—, —SO—, —N=N—, —$CF_2$—$CF_2$—,

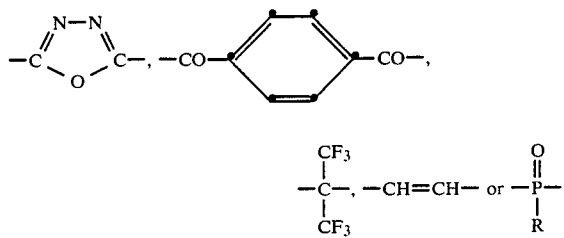

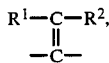

wherein R is $C_1$-$C_8$ alkyl, or is

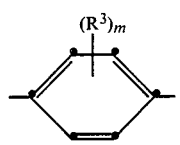

wherein each of R' and $R^2$ is a hydrogen or a halogen atom, Y is a radical of formula III or IV

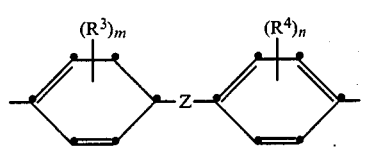
(III)

or (IV)

wherein $R^3$ and $R^4$ are the same or different and each is a halogen atom, $C_1$-$C_4$ alkyl or $C_1$-$C_4$ alkoxy, m and n are 0 or an integer from 1 to 4, and Z is a direct bond or a radical selected from the group consisting of —O—, —SO—, —$SO_2$—, —S—, —S—S—, or

wherein each of $R^5$ and $R^6$ independently of the other is a hydrogen atom, $C_1$-$C_4$ alkyl or phenyl, or is

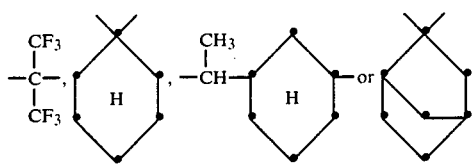

2. A polyether resin according to claim 1, which contains 100 to 20 mol % of the repeating structural unit of formula I and 80 to 0 mol % of the repeating structural unit of formula II.

3. A polyether resin according to claim 1, which contains 50 to 30 mol % of the repeating structural unit of formula I and 70 to 50 ml % of the repeating structural unit of formula II.

4. A polyether resin according to claim 1, wherein the radical X in formula I and II is —$SO_2$—, —CO—, —SO—, —$CF_2$—$CF_2$—,

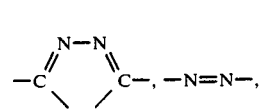

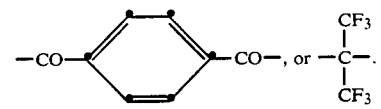

5. A polyether resin according to claim 1, wherein Y in formula II is a radical of the formula III or IV, wherein m and n are 0 and Z is a direct bond or a radical selected from the group consisting of —O—, —SO—, —$SO_2$—, —S—, —S—S—, —$CH_2$—,

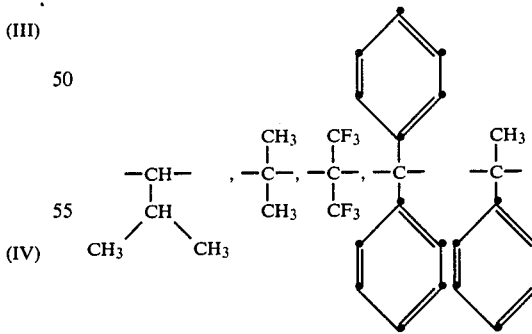

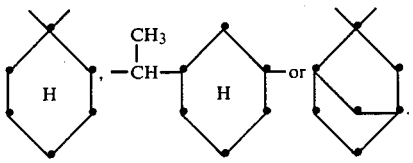

6. A polyether resin according to claim 1, said resin consisting only of the structural unit of formula I, wherein A is hexamethylene and X is sulfonyl.

7. A polyether resin according to claim 1, said resin containing the structural units of the formulae I and II, wherein A is hexamethylene, X is sulfonyl and Y is

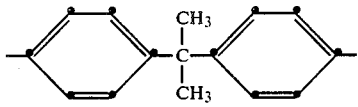

8. A process for the preparation of a polyether resin according to claim 1 and containing the repeating structural units of the formulae I and II, which process comprises polycondensing a dihalo compound of formula V

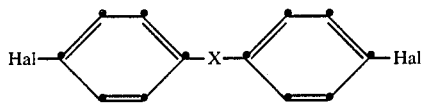
(V)

in equimolar amounts, with an α,ω-di-(p-hydroxyphenyl)alkane of formula VI

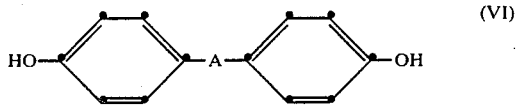
(VI)

or with a mixture of a compound of formula VI and a phenol contained therein in an amount of up to 90 mol %, of the formula VII

HO—Y—OH (VII)

wherein X, A and Y are as defined in formulae I and II and Hal is a halogen atom, in the presence of alkali and in a polar aprotic solvent, until the resultant polyether resin has a specific viscosity of 0.1 to 2.5, measured at 30° C. in a 2% solution in dimethylformamide.

9. A product obtained by crosslinking a polyether resin as claimed in claim 1 by heating said resin to not less than 250° C. or by irradiating it with energy-rich electromagnetic rays.

* * * * *